(12) United States Patent
Hall et al.

(10) Patent No.: US 6,661,975 B1
(45) Date of Patent: Dec. 9, 2003

(54) MULTI-RATE VARIABLE DUTY CYCLE MODEM FOR USE IN AN OPTICAL COMMUNICATION SYSTEM

(75) Inventors: Dennis M. Hall, Manhattan Beach, CA (US); Raymond K. DeLong, Palos Verdes Estates, CA (US); Donald G. Heflinger, Torrance, CA (US); Peter M. Tanner, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/522,802

(22) Filed: Mar. 10, 2000

(51) Int. Cl.[7] ............................................. H04B 10/16
(52) U.S. Cl. .................. 398/180; 398/37; 398/177; 398/183; 398/189; 398/201
(58) Field of Search .................. 359/181, 184, 359/186, 187, 193, 195, 173; 398/37, 177, 180

(56) References Cited

U.S. PATENT DOCUMENTS

| | | | | |
|---|---|---|---|---|
| 4,713,841 A | * | 12/1987 | Porter et al. ................. | 359/194 |
| 4,989,212 A | * | 1/1991 | Mecherle ..................... | 372/26 |
| 5,214,526 A | * | 5/1993 | Tonomura .................... | 359/184 |
| 5,315,426 A | * | 5/1994 | Aoki ............................ | 359/180 |
| 5,631,503 A | * | 5/1997 | Cioffi .......................... | 307/66 |
| 5,689,248 A | * | 11/1997 | Esfahani et al. ............ | 340/853.1 |
| 6,043,920 A | * | 3/2000 | Leopold et al. ............. | 359/184 |
| 6,151,149 A | * | 11/2000 | Rybicki et al. .............. | 359/186 |
| 6,445,477 B1 | * | 9/2002 | Madsen et al. .............. | 359/187 |

\* cited by examiner

Primary Examiner—Leslie Pascal
Assistant Examiner—Dzung Tran
(74) Attorney, Agent, or Firm—John A. Miller; Warn, Burgess & Hoffman, P.C.

(57) ABSTRACT

An optical communication system (20) is provided for transmitting a multi-rate data signal between a transmitter (22) and a receiver (24) in a power efficient manner. The optical communication system (20) includes an optical source (32) that supplies an optical carrier signal; an encoder (44) that receives and encodes a data signal; an external phase modulator (42) that modulates the optical carrier signal with the encoded data signal, such that the modulator (42) varies the duty factor of the modulated optical signal based on the encoded data signal; and an optically saturated erbium doped fiber amplifier (36) that amplifies the modulated optical signal prior to transmission by the transmitter (22). In accordance with the present invention, the modulation scheme of the optical communication system (20) varies the duty cycle of the modulation to attain power efficiency during periods of low data demand. In an alternative modulation scheme, data bits are encoded using bi-phase mark encoding and are transmitted in variable-length blocks.

24 Claims, 6 Drawing Sheets

MULTI-RATE VARIABLE DUTY CYCLE MODEM FOR USE IN AN OPTICAL COMMUNICATION SYSTEM

CROSS REFERENCE TO RELATED APPLICATIONS

This application is related to the following commonly assigned applications: "Apparatus and Method For Tuning an Optical Interferometer", Ser. No. 09/236,981, filed Jan. 26, 1999, having inventors Donald Heflinger, Jeffrey Bauch, and Todd Humes; "High Speed Differential Optoelectronic Receiver", Ser. No. 09/206,912, filed Dec. 7, 1998, having inventors Donald Heflinger, Phillip Hayashida, Todd Humes and John Hyde, assigned to the same assignee as this present invention.

BACKGROUND OF THE INVENTION

1. Field of the Invention

This invention relates generally to an optical communication system and, more particularly, to a multi-rate variable duty cycle modem for use in an optical intersatellite link.

2. Discussion of the Related Art

Optical communication systems for use in spacecraft have heretofore been limited to much less than 0.5 watts of power. Although the availability of rare earth element doped fiber amplifiers has increased the potential to deliver more watts of power, there remains a focus on efficient use of power when designing these types of optical communication systems.

Fiber amplifiers also facilitate the implementation of external modulators in an optical communication system. External modulators generally allow the use of differential phase-shifted keyed (DPSK) modulation and other efficient modulation techniques at data rates from 1 to 13 Gb/s. Unfortunately, due to the lack of narrowband fiber-based optical filters, an optical communication system employing these fiber amplifiers becomes inefficient at data rates below 1 Gb/s. As a result, there is a need to design optical communications systems which are power efficient at rates lower than 1 Gb/s. In this way, optical communication systems used in the spacecraft environment are able to conserve power during periods of low data demand.

Therefore, it is desirable to provide an optical communication system for transmitting multi-rate data signals in a power efficient manner.

SUMMARY OF THE INVENTION

In accordance with the present invention, an optical communication system is provided for transmitting a multi-rate data signal between a transmitter and a receiver in a power efficient manner. The optical communication system includes an optical source that supplies an optical carrier signal; an encoder that receives and encodes a data signal; a modulator that modulates the optical carrier signal with the encoded data signal, such that the modulator varies the duty factor of the modulated optical signal based on the encoded data signal; and a fiber amplifier that amplifies the modulated optical signal prior to transmission by the transmitter. In accordance with the present invention, the modulation scheme of the optical communication system varies the duty cycle of the modulation to attain power efficiency during periods of low data demand.

In an alternative modulation scheme, data bits are encoded using bi-phase mark encoding and are transmitted in variable-length blocks. Although this alternative modulation scheme pays a power penalty, it enables the use of a common interferometric demodulator for all modulation rates. Moreover, the power penalty decreases with the number of bits transmitted in each block.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the present invention is described herein with reference to illustrative embodiments for particular applications (e.g., inter-satellite links), it should be understood that the invention is not limited thereto. Any optical data communication system that transmits multi-rate data signals and requires power conservation during periods of low data demand could benefit from the present invention. Those having ordinary skill in the art and access to the teachings provided herein will recognize additional modifications, applications and embodiments within the scope thereof and additional fields in which the present invention would be of significant utility.

Figure 1:
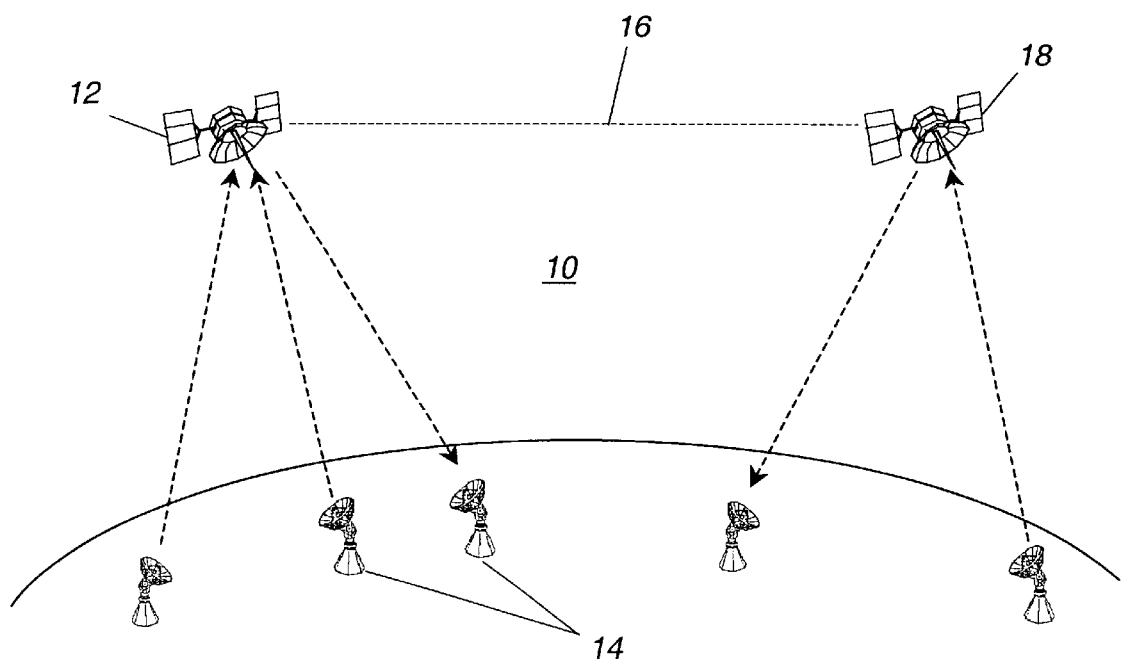
FIG. 1 is a diagram illustrating a typical satellite data communication system.

A typical satellite communication system 10 is depicted in FIG. 1. The satellite communication system 10 includes at least one geosynchronous orbiting satellite 12 which may complete a virtual circuit connection between two of a plurality of ground stations 14. Generally, information is uplinked from a transmitting ground station 14 to the satellite 12 which in turn downlinks the information to a receiving ground station 14. However, in order to extend communication coverage of the satellite communication system 10, a satellite 12 may also communicate via an inter-satellite link 16 directly with a second satellite 18 which may in turn communicate with other ground stations 14.

Figure 2:
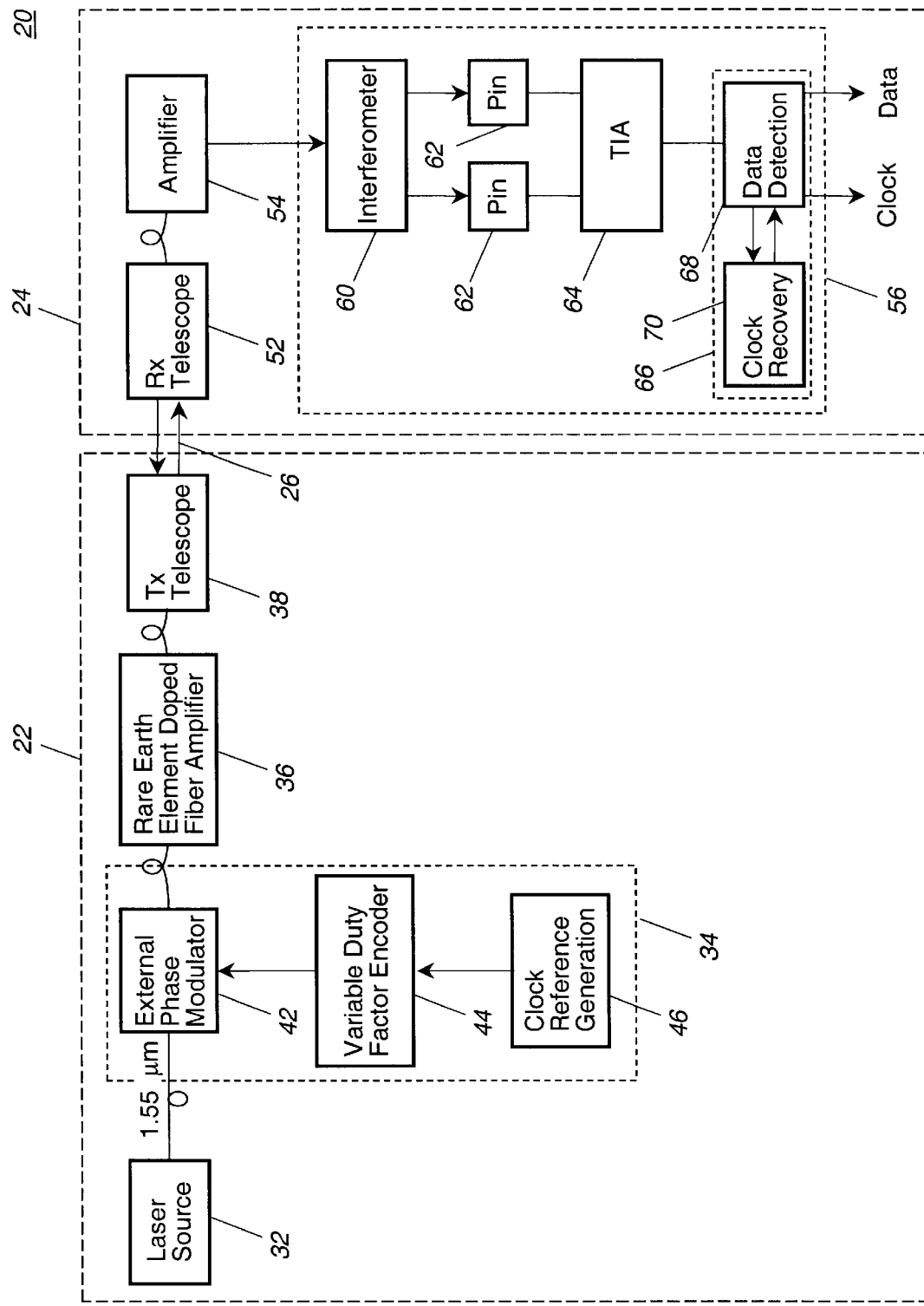
FIG. 2 is a block diagram showing the components of an optical communication system in accordance with the present invention.

FIG. 2 shows the communication components for an optical communication system 20 in accordance with the present invention. As will be more fully explained, the optical communication system 20 is properly suited to handle multi-rate data signals associated with an inter-satellite link. However, the optical communication system 20 is not exclusive to an inter-satellite link, in that it may also be applicable to an optical communication link between a single ground station and a satellite.

Generally, the optical communication system 20 includes a transmitter 22 for sending data signals and a receiver 24 for receiving data signals. A transmission link or channel 26 is the physical path over which the data signals flow from the transmitter 22 to the receiver 24. The transmitter 22 is comprised of an optical source 32, a modulator 34, a rare earth element doped fiber amplifier 36 and a transmitting telescope 38. An optical carrier signal from the optical source 32 (e.g., a laser diode) is modulated with a data signal by the modulator 34. The fiber amplifier 36 (e.g., erbium doped) then amplifies the modulated optical signal from the modulator 34 prior to it being transmitted by the transmitting telescope 38.

More specifically, the modulator 34 includes an external phase modulator 42, a variable duty factor encoder 44, and a clock reference generator 46. The phase modulator 42 varies the phase of the optical carrier signal based on information encoded in the data signal from the encoder 44, thereby generating the modulated optical signal. In addition, the phase modulator 42 is operative to vary the duty factor (i.e., the duty cycle) of the modulated optical signal based on the encoded data signal. As is well known in the art, the encoder 44 also receives a clock signal from the clock reference generator 46.

To enable the lower data rate duty factors applied to the external phase modulator to attain power efficiency, the rare earth element doped fiber amplifier 36 is to be operated in the optically saturated average power limited to mode for all data rates rather than in the optically linear peak power limited mode. This is done by ensuring that the average optical power level going into the amplifier at the lowest desired data rate, and thus the lowest duty factor, is always high enough to optically saturate the last portion of the optical amplifier. In addition, this average power should not be so high as to saturate the beginning portion of the optical amplifier. Optical saturation occurs when there is enough average optical power being amplified so as to extract optical gain from every available optically pumped doped rare earth element present in the fiber. In this way, the total average optical output power delivered by the optical amplifier remains the same even if the average optical input power is increased, as is the case when the duty factor is increased to increase the data rate. High power optical amplifiers, as are applicable to optical intersatellite links, can be made to operate in this optically saturated mode.

Figure 3:
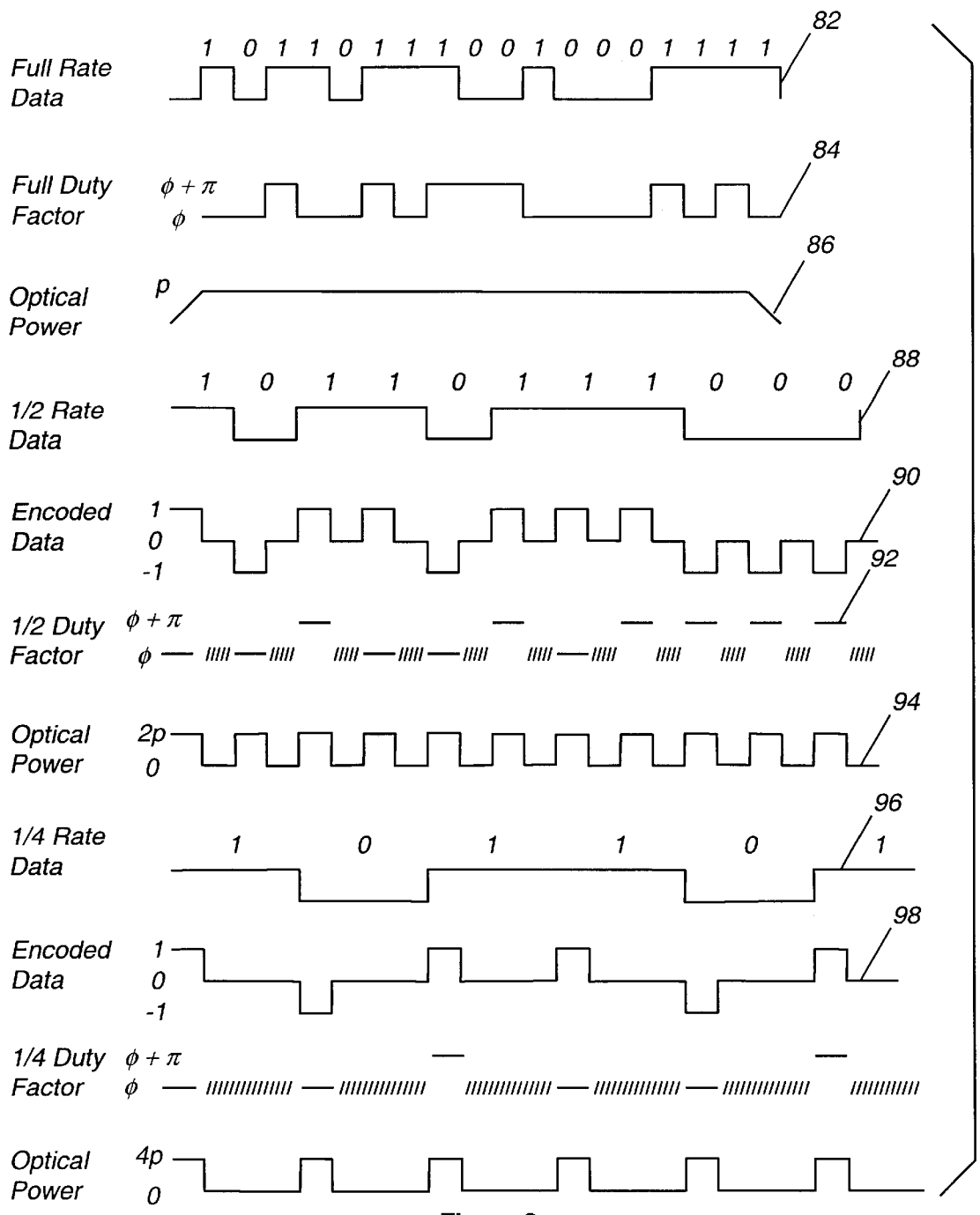
FIG. 3 is a diagram illustrating a power efficient modulation scheme embodied in the optical communication system of the present invention.

The modulation scheme as embodied in transmitter 22 is better understood in relation to FIG. 3. Generally, the modulation scheme of the present invention utilizes DPSK modulation on an optical carrier signal to transmit a data signal. A typical full rate data signal 82 going into the modulator 34 and the optical phase of a corresponding carrier signal 84 coming out of the modulator 42 are shown in FIG. 3. The optical power used to transmit the full rate optical signal is also shown at 86. In this case, all of the optical power associated with fiber amplifier 36 is being used during the full duration of the each bit period. Although DPSK is the presently preferred modulation technique, this is not intended as a limitation on the broader aspects of the invention. On the contrary, pulse width modulation (PWM), pulse position modulation (PPM), on-off keyed modulation, pulse amplitude modulation (PAM) and other non-continuous types of modulation techniques may be suitable.

To attain power efficiency at lower data rates, the duty factor of the modulation scheme is varied. To do so, the phase modulator 42 is turned "off" and "on" based on information encoded in the signal received from the encoder 44. In particular, the encoder 44 employs the following coding approach: (a) when the encoded signal is "1", the phase modulator 42 changes the phase (by $\pi$ radians) of the optical carrier signal; (b) when the encoded signal is "0", the phase modulator 42 sets the output to zero power; and (c) when the encoded signal is "−1", the phase modulator 42 keeps the phase constant.

A half rate data signal 88 is used to illustrate the improved power efficiency of the present invention. In this case, the encoded data signal coming from the encoder 44 is shown at 90 and the optical phase of a corresponding carrier signal coming out of the phase modulator 42 is shown at 92. When the phase modulator 42 is turned off (as signified by the slashes in the modulated optical signal 92), the fiber amplifier 36 is not using optical power. This is best seen at 94 which depicts the optical power used to transmit the half rate optical signal.

By using the modulation scheme of the present invention, the same amount of optical power is used for the half rate signal as is used for the full rate signal. Because the fiber amplifier 36 is optically saturated and thus average power limited, rather than peak power limited, the power used for the half rate signal is going to be twice as much, denoted in 94 by 2P, as the full rate signal but for only half of the duration of each bit period. In either case, the average power expended by the fiber amplifier 36 is the same. Similar power efficiency is achieved by applying the same modulation scheme to a quarter rate data signal 96. The encoded signal corresponding to this quarter rate data signal 96 is shown in 98 and must include transitions that occur at duration intervals that correspond to the full rate.

Referring back to FIG. 2, the receiver 24 for the optical communication system 20 of the present invention is comprised of a receiving telescope 52, an amplifier 54 and a demodulator 56. The receiving telescope 52 receives the optical data signal transmitted by the transmitter 22. A low noise amplifier 54, as is well known in the art, amplifies the signal before it is demodulated by demodulator 56.

The demodulator 56 is further defined as an interferometer 60, two photodetectors 62, a transimpedence amplifier 64 and a data recovery unit 66. First, the interferometer 60 splits the received optical signal into two optical signals, one of which is passed over a selectable delay line. The photodetectors 62 are used to convert the incoming light pulse signals into corresponding current pulse signals. Prior to being converted into a voltage signal, the current pulse signals are detected and amplified by the low noise transimpedence amplifier 64. While this embodiment employs a PIN photodiode, it is readily understood that other types of photodetectors, including photomultipliers and avalanche photodiodes, may also be used as photodetectors 62.

Next, the data recovery unit 66 translates this voltage signal into a data signal and a clock signal. To do so, the data recovery unit 66 includes a data detection component 68 and a clock recovery component 70. It is envisioned that a bit synchronizer may be used as the clock recovery component 70 to extract a clock signal. As will be apparent to one skilled in the art, the data detection component 68 then uses the recovered clock signal to detect and decode the transmitted data signal from the voltage signal received from the transimpedence amplifier 64. The detection of the data is performed over an interval of time corresponding to the duration of a bit at the full rate even for the lower data rates. It is only during this interval that there will be optical signal present. For lower data rates, there will be an interval during the duration of the lower data rate bit where no light is present, and the previously detected data is maintained for the remainder of the data bit since no light is present on which to perform data detection.

Figure 4:
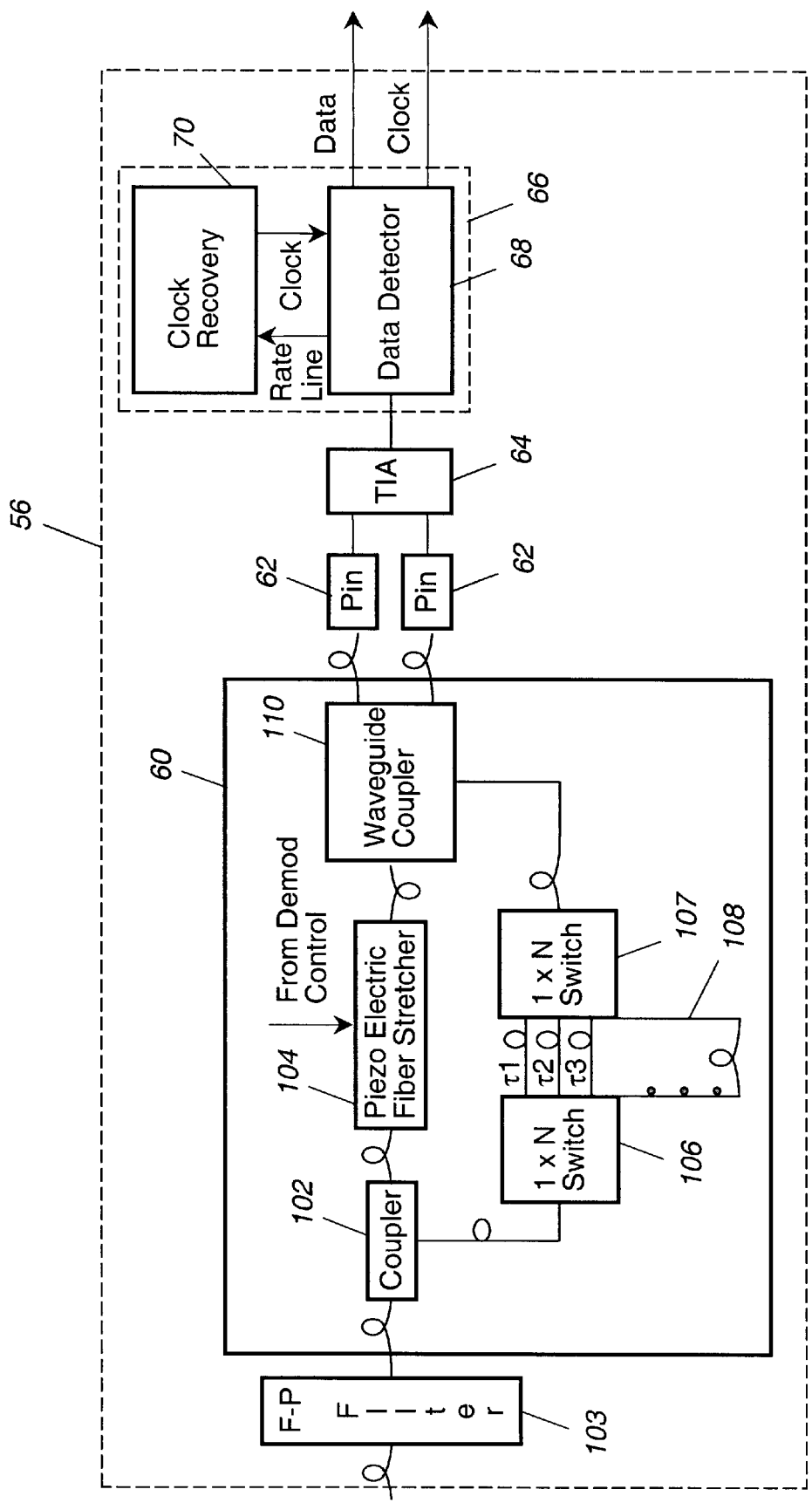
FIG. 4 is a block diagram showing an interferometer with selectable delay lines for use in the optical communication system of the present invention.

FIG. 4 shows how to use a polarization-maintaining fiber to build the multi-rate demodulator 56, and in particular an interferometer 60 with selectable delay lines. The interferometer 60 includes a first waveguide coupler 102, a piezoelectric fiber stretcher 104, two optical switches 106 and 107, and a second waveguide coupler 110. The first waveguide coupler 102 optically connects through a filter 103 to the amplifier 54 (not shown) and splits the amplified optical signal into two optical signals. The piezoelectric fiber stretcher 104 piezoelectrically tunes the optical path length in an optical fiber traveled by one of the signals without bending losses and other restrictions. Two optical switches 106 and 107 are used to pass the other signal over one of a plurality of selectable delay lines 108. Lastly, a second waveguide coupler 110 is used to optically interfere the two optical signals and connect the interference output to the two photodetectors 62. In this way, the interferometer 60 provides a different delay line for each of the data rates supported by the multi-rate optical communication system 20 of the present invention.

The state of interference delivered by waveguide coupler 110 is actively tuned by piezoelectric fiber stretcher 104 so that light from the two paths having the same phase is all directed to one photodetector while light arriving with opposite phase (differing by $\pi$ radians) is all directed to the other photodetector. The technique for tuning this interferometer is preferably the approach described in U.S. patent application Ser. No. 09/236,981, filed on Jan. 26, 1999, entitled "Apparatus and Method For Tuning an Optical Interferometer", by Donald Heflinger, Jeffrey Bauch, and Todd Humes. The photodetectors 62 and the transimpedance amplifier 64 comprise the optoelectronic receiver which is preferably the receiver described in U.S. patent application Ser. No. 09/206,912, filed on Dec. 7, 1998, entitled "High Speed Differential Optoelectronic Receiver", by Donald Heflinger, Phillip Hayashida, Todd Humes, and John Hyde.

A second embodiment of the present invention implements an alternative modulation scheme that uses bi-phase mark encoding of the data bits. The data bits are transmitted in variable-length blocks. Typically, bi-phase mark encoding uses a reference bit followed by one or more data bits in each block of bits, such that "1" is represented by a midbit level change and "0" is represented by no midbit level change.

Figure 5:
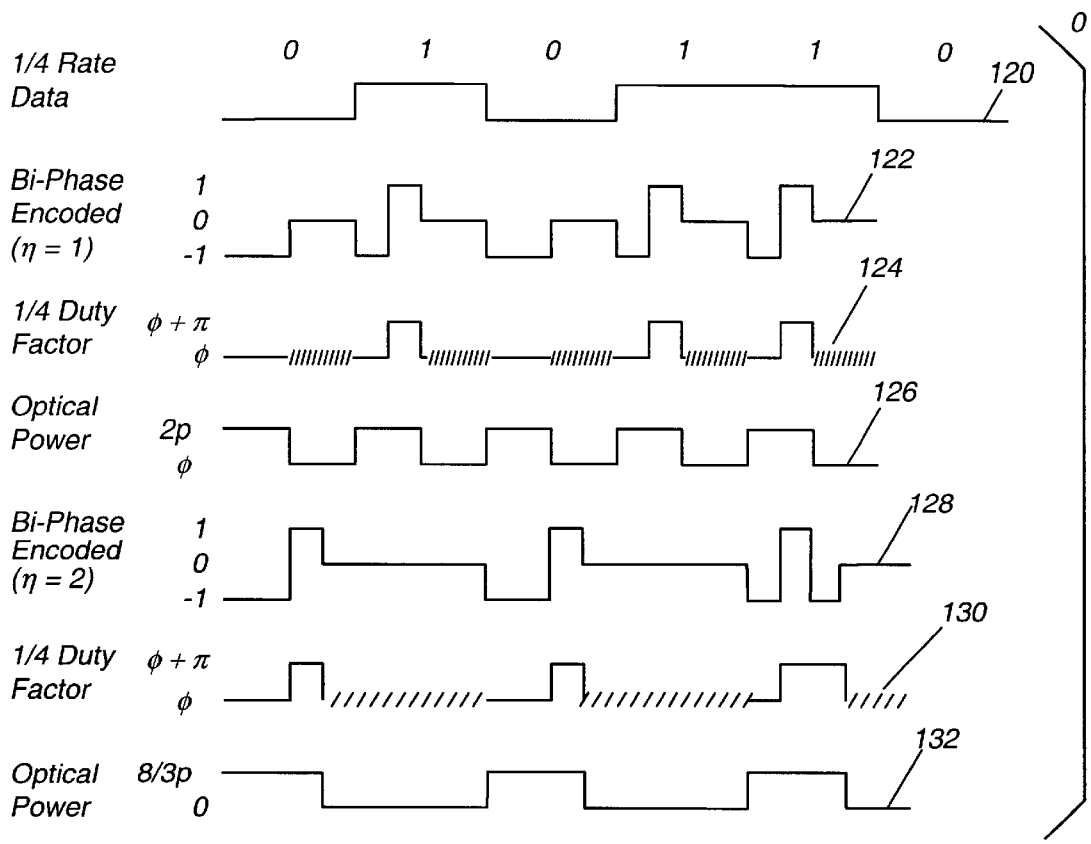
FIG. 5 is a diagram illustrating an alternative modulation scheme which uses bi-phase mark encoding and transmits data bits in variable-length blocks.

However, since the phase modulator 42 is turned "off" and "on" based on information encoded in the signal received from the encoder 44, conventional bi-phase mark encoding is modified as follows: (a) when the encoded signal is "1", the phase modulator 42 changes the phase (by pi radians) of the optical carrier signal; (b) when the encoded signal is "0", the phase modulator 42 sets the output to zero power; and (c) when the encoded signal is "−1", the phase modulator 42 keeps the phase constant. This variation of bi-phase mark encoding in accordance with the modulation scheme of the present invention is better understood in relation to FIG. 5.

A quarter rate data signal 120 is used to illustrate the improved power efficiency of this alternative modulation scheme. A first example shows an encoded data signal 122 coming from the encoder 44 along with the optical phase of a corresponding carrier signal 124 coming from the modulator 42. In this example, two bits (i.e., a reference bit and a data bit) are transmitted in each block. The optical power, denoted in 126 by 2P, is twice that delivered for full rate DPSK transmission described by the optical power denoted in 86. A second example also shows an encoded data signal 128 and the optical phase of a corresponding carrier signal 130. In this example, however, three bits are transmitted in each block. The optical power denoted in 132 by 8/3P, is 8/3 as large as that delivered for full rate DPSK transmission. In either case, the phase modulator 42 uses DPSK modulation of an optical carrier signal to transmit the data signal.

When using bi-phase mark encoding, a power penalty is incurred to transmit the reference bit in each block. However, the power penalty is determined by the size of the "burst" or number of bits transmitted in each block. If n data bits are transmitted (where the block includes a reference bit and n data bits), then the power penalty is $10 \log (1+1/n)$ dB, n>1. Accordingly, the above-described first example pays a 3.0 dB power penalty as shown at 126 (since quarter data rate data would need to deliver 4P instead of just 2P during each data bit) and the second example pays a 1.8 dB power penalty as shown at 132.

Figure 6:
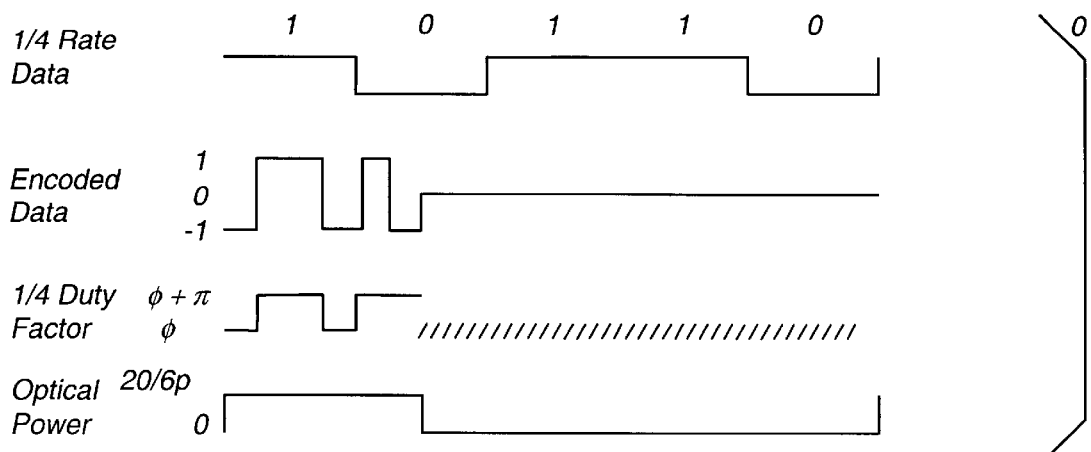
FIG. 6 is a block diagram showing an interferometer with fixed delay lines for use with the alternative modulation scheme in accordance with the present invention.

In this way, the power penalty decreases with the number of bits transmitted in each block. FIG. 6 shows a preferred implementation of this alternative modulation scheme where n=5. In other words, six bits are transmitted in each block (i.e., 1 reference bit and 5 data bits), and thus the penalty power is 0.8 dB.

Figure 7:
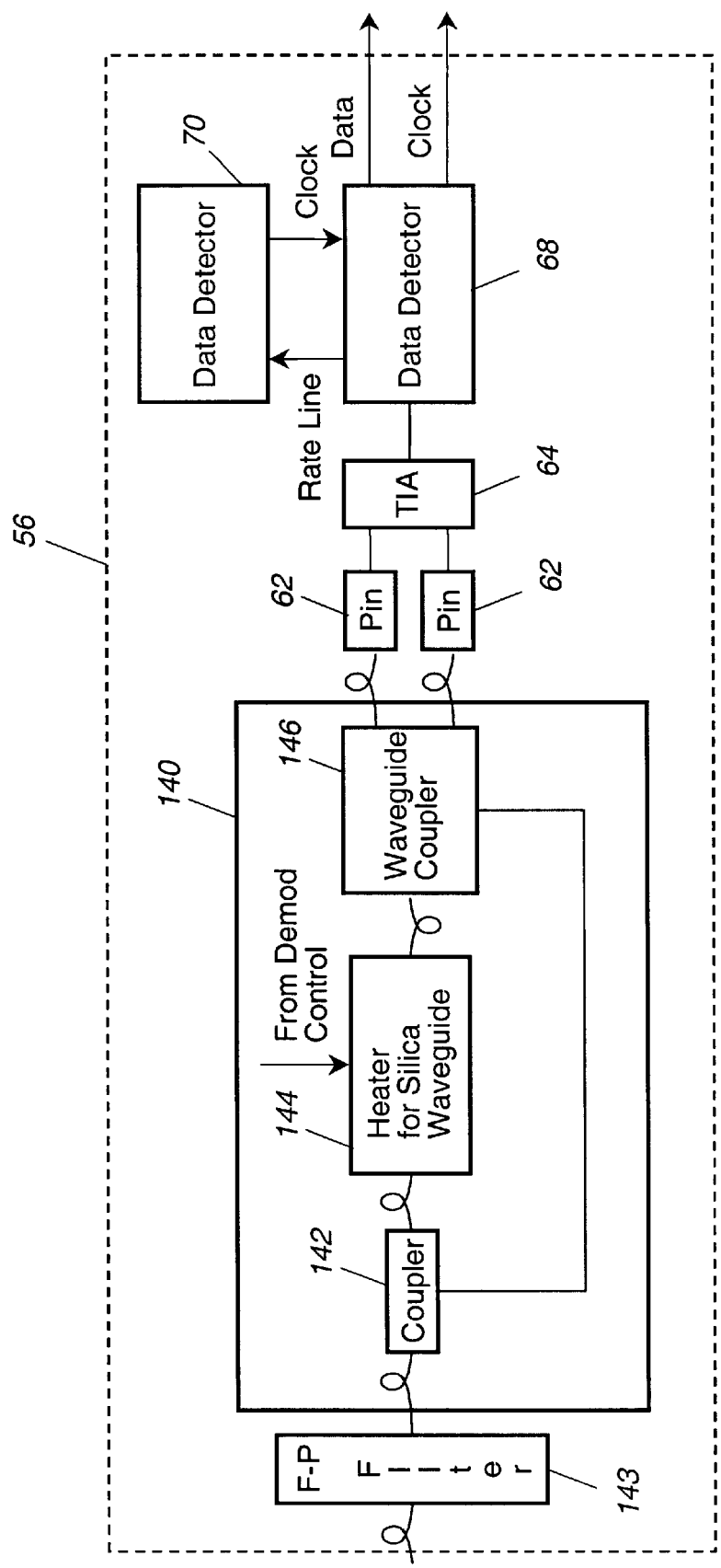
FIG. 7 is a fixed delay line interferometer for use in a second embodiment of the optical communications system of the invention.

Although this preferred modulation scheme pays a slight power penalty, it enables the use of a more common interferometer having fixed delay lines. In other words, the use of bi-phase mark encoding eliminates the need for selectable delay lines, thereby simplifying the multi-rate demodulator 56. FIG. 7 illustrates a fixed delay line interferometer 140 for use in a second embodiment of the optical communication system 20. It should be noted that the hardware components for this embodiment are otherwise the same as discussed in relation to FIG. 2.

The more common interferometer 140 is comprised of a first waveguide coupler 142, a heater waveguide 144, and a second waveguide coupler 146. The first waveguide coupler 142 optically connects through a filter 143 to the amplifier 54 (not shown) and splits the amplified optical signal into two optical signals. One of the signals is passed through the heater waveguide 144, whereas the other signal passes directly to the second waveguide coupler 146. The second waveguide coupler 146 is used to optically connect each of these optical signals to the two photodetectors 62. The heater waveguide enables the state of optical interference to be actively tuned so that light from the two paths having the same phase is all directed to one photodetector while light arriving with opposite phase (differing by $\pi$ radians) is all directed to the other photodetector. In this way, the interferometer only provides two optical paths for the multi-rate signals being transmitted in this embodiment of the optical communication system 20.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An optical communication system for transmitting a multi-rate data signal between a transmitter and a receiver, said data signal having a variable data rate, the transmitter comprising:

an optical source for providing an optical carrier signal;

an encoder for receiving the data signal and encoding the data signal into an encoded data signal, said encoded data signal being encoded based on the data rate of the data signal;

a modulator for receiving the encoded data signal and the optical carrier signal, said modulator modulating the optical carrier signal with the encoded data signal to provide a modulated optical signal, wherein the encoded data signal causes the modulator to vary the duty factor of the modulated optical signal depending on the data rate of the data signal; and an optical fiber amplifier receiving the modulated optical signal and providing an amplified modulated optical signal for transmission by the transmitter, wherein the fiber amplifier is not using optical power during predetermined times if the data rate of the data signal is below a predetermined full data rate.

2. The optical communication system of claim 1 further comprising a telescope component for transmitting the amplified modulated optical signal to the receiver.

3. The optical communication system of claim 1 wherein the modulator varies the duty factor of the modulated optical signal based on the encoded data signal.

4. The optical communication system of claim 1 wherein the modulator varies the duty factor of the modulated optical signal by turning on and off the power.

5. The optical communication system of claim 1 wherein the modulator employs differential phase-shift keying (DPSK) modulation to provide the modulated optical signal.

6. The optical communication system of claim 1 wherein the modulator employs a modulation technique selected from the group consisting of differential phase-shift keying (DPSK) modulation, pulse width modulation (PWM), pulse position modulation (PPM), on-off keyed modulation, and pulse amplitude modulation (PAM).

7. The optical communication system of claim 1 wherein the encoded data signal is based on bi-phase mark encoding.

8. The optical communication system of claim 1 wherein the fiber amplifier is average power limited.

9. The optical communication system of claim 1 wherein the optical communication system being further defined as a satellite communication system, such that the transmitter is associated with at least one of a satellite and an earth terminal and the receiver being associated with at least one of a second satellite and a second earth terminal.

10. The optical communication system of claim 1 wherein the receiver comprises:

a telescope component for receiving the modulated optical signal from the transmitter;

an amplifier for receiving the modulated optical signal and amplifying the modulated optical signal into an amplified modulated optical signal; and a demodulator for receiving the amplified modulated optical signal and demodulating the amplified modulated optical signal into a data signal and a clock reference signal.

11. The optical communication system of claim 10 wherein the demodulator further comprises:

an interferometer for receiving the modulated optical signal and splitting the modulated optical signal into two optical signals, the interferometer having a plurality of selectable delay lines and being operative to pass one of the optical signals over one of the selectable delay lines;

two photodetectors optically connected to the interferometer, each photodetector receiving one of the optical signals and converting the optical signal into a current pulse signal;

a transimpedence amplifier receiving each of the current pulse signals and providing an amplified voltage signal; and a data recovery unit for receiving the amplified voltage signal and decoding the voltage signal into the data signal and the clock reference signal.

12. The optical communications system according to claim 1 wherein the optical fiber amplifier operates in an optically saturated average power limited mode for all of the data rates of the data signal.

13. A method for transmitting a power efficient multi-rate data signal between a transmitter and a receiver in an optical communication system, said data signal having a variable data rate, comprising the steps of:

receiving a data signal;

encoding the data signal into an encoded data signal based on the data rate of the data signal;

providing an optical carrier signal for transmitting the data signal;

modulating the optical carrier signal with the data rate of the encoded data signal to provide a modulated optical signal;

varying the duty factor of the modulated optical signal based on the encoded data signal; and amplifying and optically saturating the modulated data signal prior to transmission by the transmitter, wherein amplifying and optically saturating the modulated data signal includes operating a fiber amplifier in optical saturation where the optical amplifier does not use optical power during predetermined times if the data rate of the data signal is below a predetermined full data rate.

14. The method of claim 13 further comprising the step of transmitting the amplified modulated data signal to the receiver.

15. The method of claim 13 wherein the step of varying the duty factor further comprises turning on and off the power of a modulator.

16. The method of claim 13 wherein the step of modulating the optical carrier signal further comprises using differential phase-shift keying (DPSK) modulation.

17. The method of claim 13 wherein the step of modulating the optical carrier signal further comprises a modulation technique selected from the group consisting of differential phase-shift keying (DPSK) modulation, pulse width modulation (PWM), pulse position modulation (PPM), on-off keyed modulation, and pulse amplitude modulation (PAM).

18. The method of claim 13 wherein the step of encoding the data signal further comprises using bi-phase mark encoding.

19. The method of claim 13 wherein the step of amplifying the modulated data signal further comprises using an average power limited amplifying device.

20. The method of claim 13 wherein the step of amplifying the modulated data signal further comprises using an erbium doped fiber amplifier.

21. The method of claim 13 wherein the optical communication system being a satellite communication system, such that the transmitter is associated with at least one of a satellite and an earth terminal and the receiver is associated with at least one of a second satellite and a second earth terminal.

22. The method of claim 13 further comprising the steps of:

receiving the transmitted optical signal at the receiver;

amplifying the transmitted optical signal into an amplified optical signal; and demodulating the amplified optical signal into a data signal and a clock reference signal.

23. The method of claim 22 wherein the step of demodulating the amplified optical signal further comprises the steps of:

splitting the amplified optical signal into two optical signals;

passing at least one of the two optical signals over one of a plurality of selectable delay lines;

combining the two optical signals inteferemetrically to create two new optical signals converting the two new optical signals into a voltage signal; and decoding the voltage signal into a data signal and a clock reference signal.

24. A method for transmitting a power efficient multi-rate data signal between a transmitter and a receiver in an optical communication system, said data signal having a variable data rate, comprising the steps of:

receiving a data signal at an encoder;

encoding the data signal into the encoded data signal, the encoded data signal being indicative of the data rate of the data signal;

providing an optical carrier signal from an optical source to a modulator;

receiving the encoded data signal at the modulator;

modulating the optical carrier signal with the encoded data signal to provide a modulated optical signal;

varying the duty factor of the modulated optical signal by turning on and off the power of the modulator, the duty factor of the modulated optical signal being based on the data rate of the encoded data signal;

amplifying the modulated optical signal using a power average amplifying device, wherein amplifying the modulated optical signal includes operating a fiber amplifier so that the optical amplifier does not use optical power during predetermined times if the data rate of the data signal is below a predetermined full data rate; and transmitting the amplified modulated optical signal to the receiver, thereby transmitting the data signal in a power efficient manner.

* * * * *